United States Patent Office.

CALEB B. BOYCE, OF CHICAGO, ILLINOIS, ASSIGNOR OF ONE-HALF TO JOHN K. POLLARD, OF SAME PLACE.

INCRUSTATION-PREVENTIVE.

SPECIFICATION forming part of Letters Patent No. 259,355, dated June 13, 1882.

Application filed March 20, 1882. (No specimens.)

*To all whom it may concern:*

Be it known that I, CALEB B. BOYCE, of Chicago, in the county of Cook and State of Illinois, have invented a new and useful Compound for Cleaning Steam-Boilers, of which the following is a specification.

Chloride of zinc is used to coat the iron, in combination with the other ingredients named, and to neutralize certain gases in waters long boiled, and thus prevent the acid from eating pockets in the boiler. Powdered sumac is used for its tannin properties, and in combination with the zinc, to stop small leaks. The solid extract of logwood is used with the extract of hemlock-bark to give a thicker coating to the boiler than can be otherwise attained; and in connection with the foregoing the flour of slippery-elm bark is used to cause the compound to adhere more readily to the iron. These ingredients not only coat the boiler and prevent incrustation, but hold in solution those impurities in the water which would otherwise generate dangerous gases, and prevent foaming and disintegration of the iron.

Practical experiments have proven that, while some of the ingredients (aside from the zinc) may not be required in some specific waters, they are required to form a compound which will render it safe to use the various waters of the country to generate steam to be used as a power; and in this regard the novelty and utility of the compound lies, and differs from other compounds containing part of the ingredients named.

The proportions I have found the best are as follows: To one and one-fourth ton of ground hemlock-bark are added one hundred pounds of the solid extract of logwood, one hundred and fifty pounds of the flour of slippery-elm bark, and one hundred and fifty pounds of ground sumac. All these ingredients are put in a suitable vessel. There is added thereto about three hundred gallons of water, which is brought to about 140°, and kept at that heat till the soluble substances of the ingredients are extracted. The liquid is then strained off, and to it is added thirty gallons of the chloride of zinc, and the compound is fit for use.

In applying the compound to use one gallon will be found sufficient per horse-power per month unless the water has to be blown off often to clear the boiler of clay or mud. In the latter case the compound should be put in the boiler at each time the boiler is emptied and refilled. The proportions of the ingredients may be changed and answer a purpose; but experiments have proven that the proportions given are the best.

I disclaim the general use of any of the ingredients, or a combination in less number than stated, and confine myself to the specific compound and the purpose stated.

I claim—

A compound for cleaning steam-boilers, consisting of logwood, hemlock-bark, slippery-elm bark, sumac, and chloride of zinc, combined as and for the purpose stated.

CALEB B. BOYCE.

Witnesses:
G. L. CHAPIN,
D. E. ARMSTRONG.